United States Patent [19]

Patterson, Jr.

[11] Patent Number: 4,718,011
[45] Date of Patent: Jan. 5, 1988

[54] WELL LOGGING DATA ACQUISITION, TELEMETRY AND CONTROL METHOD AND SYSTEM

[75] Inventor: Henry B. Patterson, Jr., Houston, Tex.

[73] Assignee: Western Atlas International, Inc., Houston, Tex.

[21] Appl. No.: 934,060

[22] Filed: Nov. 24, 1986

Related U.S. Application Data

[63] Continuation of Ser. No. 438,065, Nov. 1, 1982.

[51] Int. Cl.$^4$ .............................................. G01V 1/40
[52] U.S. Cl. ...................................... 364/422; 367/25; 340/825.54
[58] Field of Search ................ 364/422; 340/853, 856, 340/857, 860, 861, 825.54, 825.34; 181/102; 367/25, 35

[56] References Cited

U.S. PATENT DOCUMENTS

| | | | |
|---|---|---|---|
| 4,216,536 | 8/1986 | More | 367/25 |
| 4,227,405 | 10/1980 | West | 340/422 |
| 4,307,265 | 12/1981 | Hagen et al. | 178/3 |
| 4,350,979 | 9/1982 | Eberwein | 364/422 |
| 4,355,310 | 10/1982 | Belaigues et al. | 340/858 |
| 4,415,895 | 11/1983 | Flagg | 340/857 |

OTHER PUBLICATIONS

"Bidirectional Telemetry for Downhole Well Logging", Matthews, Petroleum Engineer, Sep. 1977.
"Applications and Uses of Microprocessors in Wireline Logging", Taylor et al, Petroleum Times, Jan. 1982, pp. 10–17.

Primary Examiner—Nelson Moskowitz
Assistant Examiner—Ian J. Lobo
Attorney, Agent, or Firm—Patrick H. McCollum

[57] ABSTRACT

A downhole microprocessor controller disposed in a well logging sonde receives and stores one or more preselected tables or series of logging tool commands down loaded from a surface computer through a logging cable telemetry link. Each tool command in a particular table may correspond to a specific function to be performed by a respective logging tool comprising the sonde. All such commands in a given table may be called up by the controller from memory in response to a corresponding sequence command from the surface computer corresponding with the desired table. Upon receipt of such a sequence command, the microprocessor sequentially recalls each of the table's tool commands and relays them in order to the tools. Each command has an address field and a command field, and each tool has a universal interface which decodes the fields whereby a particular tool may be selected by the address field and preselected functions from a plurality thereof may be performed by the tool in accordance with the command field word. The number of tools activated, the order in which they are activated, the order in which functions are performed by a particular tool, and the number thereof are selectively variable and controllable by the software tables selected from the surface sequence commands.

10 Claims, 2 Drawing Figures

WELL LOGGING DATA ACQUISITION, TELEMETRY AND CONTROL METHOD AND SYSTEM

This application is a continuation, of application Ser. No. 438,065, filed 11/1/82.

BACKGROUND OF THE INVENTION

Well logging systems and methods have been devised which employ downhole controllers or microprocessors disposed within the logging sonde under surface system control for purposes of data acquisition, telemetry, and control, a representative one of which is described in United Kingdom Pat. No. 1,597,627 to Belaigues, et al., filed Jan. 26, 1978 and entitled "Data Transmission System for Borehole Exploration Apparatus".

One reason for the need for such complex systems has been the correlative desire to measure an increasingly larger variety and number of complex parameter data in a given traversal of the logging sonde through the borehole—a trend occasioned by the modern practice of combining an increasingly larger number of logging tools in the same "tool string". Thus, with such vast amounts of data being derived in modern logging operations, it became evident that some manner of computerized control was essential.

However, one problem with such prior computerized systems and methods has been their relative inflexibility caused by numerous factors. One approach has been to hard-wire various tool interfaces and system controllers in a custom manner for each tool under consideration. This resulted in the unfortunate situation wherein some tools were thus not adapted for use in conjunction with other tools without time consuming and expensive hardware modifications prior to the logging operation.

This in particular meant that prior to commencing a logging operation and even more so after such an operation had begun, there was no simple way to modify the order in which various tools comprising the tool string were interrogated by the downhole controller. Moreover, and in like manner, there was no way to vary the number of functions requested by the downhole controller from a particular tool or the order in which they would be supplied, as this decision had been preordained by the way the various downhole interfaces, system controller, and controllers associated with each tool had been set up.

This, in turn, frequently meant that extremely valuable logging cable band width was being occupied or, more accurately, cluttered with some types of information as temperature data, power supply voltages, borehole widths, and the like which were simply not needed as frequently as were other classes of data.

With prior systems it was impractical to vary the combinations of parameters being measured during the logging operation in acordance with varying depth increments over which they may be desired. For example, some parameters only needed to be monitored every four feet of borehole whereas others were monitored every 1/64 foot. Thus, data required every four feet would nevertheless be derived and transmitted to the surface every 1/64 foot. The only way to solve this problem appeared to be to reduce logging speeds to insure that the more important data was obtained at each borehole elevation of interest prior to moving to the next depth level—a "solution" which is extremely impractical from a commercial standpoint.

These and other disadvantages and problems of the prior art are overcome by the present invention, and an extremely flexible and adaptable well logging data acquisition, telemetry, and control system and method have thus been herein provided.

SUMMARY OF THE INVENTION

A logging sonde is provided with a micro-processor having associated memory and a telemetry link with a digital surface computer by means of the logging cable. At least one table of logging commands, each such table identified by a preselected digitally encoded sequence word or "sequence command" and comprised of a preselected plurality of digitally encoded functions to be performed in order by the logging sonde, are down loaded from the surface computer on the telemetry link and stored in the microprocessor memory prior to commencing the logging operation. Each such function is associated with a unique address associating the function with a particular logging tool or other apparatus comprising the logging string which performs the function.

The microprocessor is interconnected by means of a common three state input/output (I/O) bus to at least one remote data acquisition unit. The remote unit's function is, under commands from the microprocessor delivered on the I/O bus, to acquire logging data from a logging tool with which it is associated, digitize it (if in analog form), and transmit such data on the I/O bus to the microprocessor for further processing, if desired, and eventual delivery of such data to the well-site surface computer.

Each remote unit is comprised of an address and a function or command decode circuit. A sequence command from the surface computer instructs the downhole microprocessor to retrieve a command table from memory associated with the particular sequence command. The microprocessor will then sequentially begin placing on the I/O bus 16 bit words each comprised of an address, command, and multiplex channel select field, in order, from the table. When a particular remote unit decodes the address field by means of the address decode circuit, indicating a match has been found to its unique address strapping bits, this indicates that the particular remote unit has been addressed and is granted exclusive access to the I/O bus over all other such remote units and associated tools or other circuitry.

The command or function decode field and multiplex channel select field are then decoded by the remote unit once it has been thus correctly addressed. Depending upon the function encoded in the command field, the circuits associated with the particular tool thus addressed will proceed to perform their function or functions in response to the decoded command field, and to deliver their results on the I/O bus to the microprocessor. In the case of a logging tool which may be provided with circuitry for performing more than one operation, the outputs of all such operations may preferably be delivered to a multiplexer. The multiplexer will be instructed to permit passage of each input as a function of the particular multiplex channel select bits carried in the 16 bit word. By varying the command or function field and the multiplexer channel select bits, it will be appreciated that a number of different functions may be retrieved from a logging tool associated with the particular remote unit addressed and in any desired order dependent upon the bits in the function or command fields and the multiplex channel select fields.

It will further be appreciated that data may be retrieved from tools in any varying order dependent upon the order in which the address codes in the table selected by the sequence command from the surface are specified. Thus, not only the order of tools sampled, but the order of functions performed by a given tool from a plurality thereof may be specified and selected in accordance with the various tables downloaded from the surface, and that a particular table may be recalled which will thus specify a particular order of tool interrogation and functions performed by the various tools in response to the particular sequence command transmitted from the surface. Moreover, it will further be appreciated that the order of tool interrogation and functions performed by each tool are thus variable simple by means of varying down-loaded software, wherein the various down-loaded tables are changed from the surface.

In another preferred embodiment, inputs which are selected from the multiplexer channel select field are not limited to analog inputs which are passed through the multiplexer, converted from analog to digital form, and placed on the I/O bus. Rather, it is within the scope of the present invention to also provide for receiving measurements which are already in digital form from the particular logging tool addressed, and that the function or command field and the multiplexer channel select field may also select these digital functions or measurements of the particular logging tool addressed for subsequent transmission on the I/O bus to the subsurface microprocessor.

It is accordingly an object of the present invention to provide for a new, improved, and more flexible logging data acquisition, control, and telemetry system.

It is yet another feature of the present invention to provide a computerized logging system wherein the number of tools interrogated during the well logging process may be selectively altered by means of a computer program either prior to or during said logging operation.

Still another object of the present invention is to provide a well logging system wherein the order of logging tools interrogated may be selectively varied by means of changes in software either during or prior to the computer logging operation.

Another object of the present invention is to provide a method and apparatus for selectively addressing any one of a number of data functions performed by in a plurality of logging tools comprising a tool string in response to a command from a subsurface microprocessor.

Another object of the present invention is to permit selective changing of the order in which a plurality of functions performed by one or more of a plurality of well logging instruments is performed under control of a subsurface microprocessor.

Still another feature of the present invention is to selectively control the number of well logging tools interrogated, their order of interrogation, the number and order of functions performed per logging tool as a function of a down-loaded software table retrieved by a subsurface microprocessor controller.

Yet another object of the present invention is to vary either the number of well logging tools, their order of interrogation, the number of functions per tool, or the order of the functions per tool as a function of differing sequence commands from a surface computer transmitted to a subsurface microprocessor control system.

IN THE DRAWINGS

These and other objects and advantages are hereinafter set forth in greater detail with reference to the drawings, wherein.

DETAILED DESCRIPTION OF THE DRAWINGS

Figure 1:
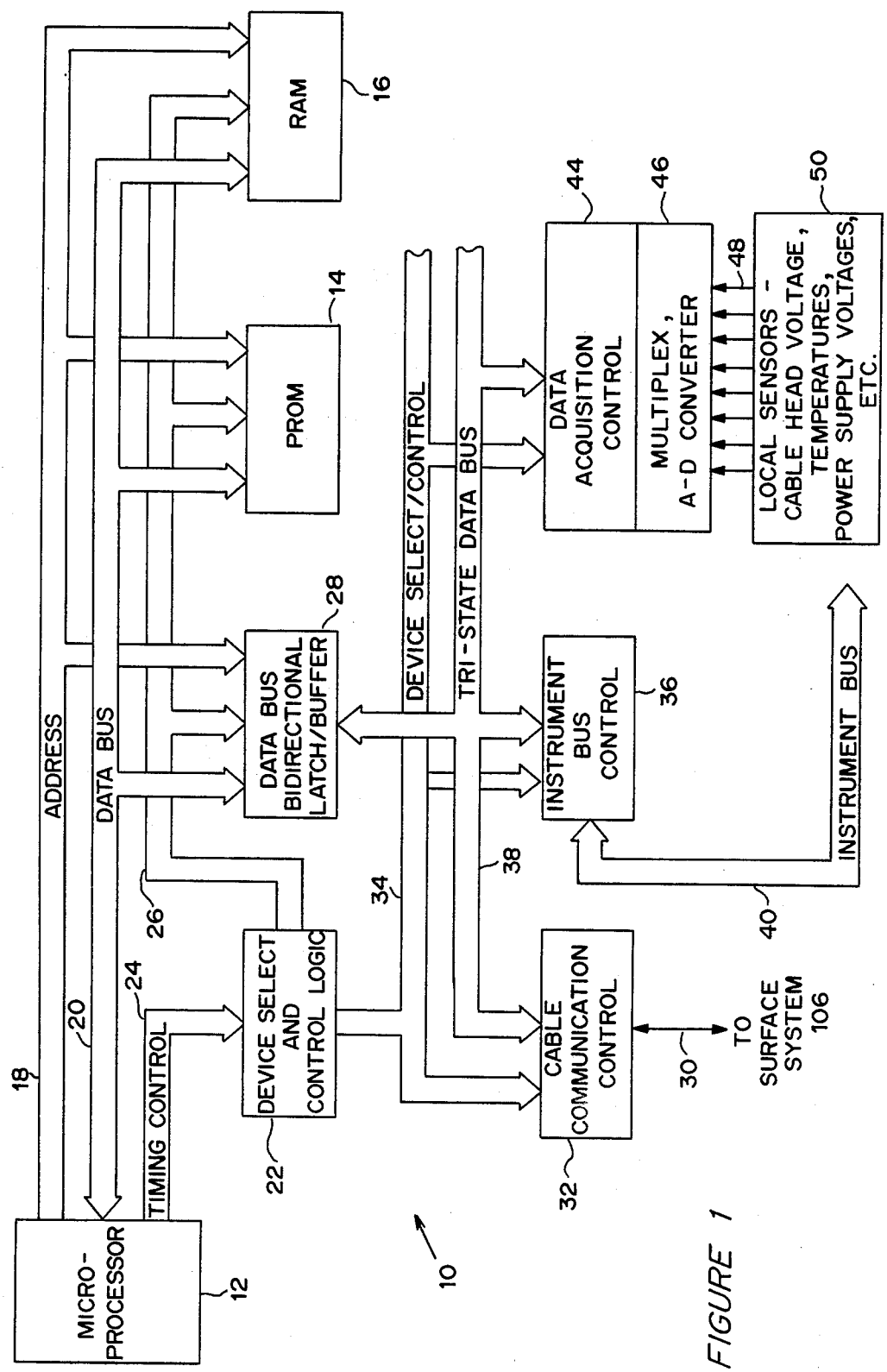
FIG. 1 is a functional block diagram of the apparatus of the present invention.

Referring first to FIG. 1 it will be noted that a subsurface master controller system 10 is shown generally depicted therein in functional block diagram form, and that, in general, it is interconnected between an appropriate computerized digital logging system or surface system 106 (not shown) by means of a conventional logging cable 30 and any desired number of remote units 42 (depicted in greater detail in FIG. 2), the latter being interconnected to the subsurface system 10 by means of an instrument bus 40.

For the present, it is sufficient to recall that it is desirable to provide a means for acquiring data under computerized control from any one of a preselected number of logging tools, and to further provide capability for selecting not only any particular tool from which to acquire data but any function associated with a particular tool. Thus, although instrument bus 40 is depicted as being interconnected to but one remote unit 42 which is associated with its particular logging tool, the instrument bus 40 is in actuality a serial party line intended to interconnect and provide a communication link between the subsurface system 10 and any number of logging tools connected to the common instrument bus 40 and interfaced by its own respective remote unit 42.

Thus, the subsurface system 10 may actually be considered as a microprocessor-based universal control element for controlling data acquisition and control of a plurality of logging tools, each of which is provided with its own remote unit 42 interface. Moreover, each remote unit 42 actually is a slave to the microprocessor of the subsurface system 10 gaining access to the instrument bus 40 only on command from the microprocessor, the instrument bus providing control and information status and data links between the microprocessor and the remote unit 42 as aforementioned.

Referring to the subsurface system 10 in more detail, there will be seen depicted in FIG. 1 a microprocessor 12 which may be of a conventional commercially available variety, and whose purpose is to provide the sequencing, data acquisition and control functions and the like of the subsurface system 10. The microprocessor 12 will thus control the acquisition of data and implementation of functions in the various tools, format the results, and further controlling the telemetry thereof to the surface in response to coded messages from the surface system 106 and tables residing in memory associated with the microprocessor 12 as will be hereinafter described in further detail.

It is conventional to provide program and data storage for such a microprocessor 12, and accordingly there will be seen in FIG. 1 appropriate programmable read only memory or PROM 14 as well as random access memory or RAM 16. Means must be provided for addressing the particular source of information to be utilized by the microprocessor, and accordingly an address bus 18 is provided for enabling the microprocessor 12 to address either the PROM 14, RAM 16, or other sources of information such as that delivered to or contained within a data bus bi-directional latch/buffer 28 whose purpose will be hereinafter described. Also in a conventional manner, the microprocessor 12 must conventionally be provided with not only means of addressing the various sources of information and data, but a means for delivery of such data from the source to the microprocessor and vice-versa. Thus, a data bus 20 is further provided interconnecting the microprocessor 12 and the corresponding latch/buffer 28, PROM 14, and RAM 16.

For purposes which will become readily apparent shortly, the microprocessor 12 must be capable of interaction with a number of devices under its control. Accordingly, in response to a timing/control output 24 from microprocessor 12, an appropriate device select and control logic circuit 22 will accordingly generate, as defined by microprocessor 12, outputs 26 and 34, the former of which is in turn delivered to the aforementioned latch/buffer 28, PROM 14, and RAM 16. With respect to the latter output 34 of circuit 22, it will be delivered to a cable communication control circuit 32, instrument bus control 36, and data acquisition and control circuit 44.

The general purpose of the control circuit 32 is to act as a communication interface or telemetry control circuit between the surface system 106 and the microprocessor 12 or any other circuit interconnected to cable communication control circuit 32 by means of a tristate data bus 38. Thus, a number of possible channels of flow of data and command signals may be effected to be hereinafter described in greater detail both as to the manner and purpose for which they are created.

Taking the microprocessor 12 as but one example, it has already been seen that, in conventional manner, the microprocessor 12 may generate an address on address bus 18 addressing latch/buffer 28, PROM 14, or RAM 16 after which data, instructions, or commands may be either retrieved from or stored in the latter by means of data bus 20. Similarly, the microprocessor 12 may generate an appropriate timing/control signal 24, which, in turn, enables the device select and control logic circuit 22 to generate device select/control signal 34 which, in turn, may select cable communication control circuit 32, instrument bus control circuit 36, or data acquisition control circuit 44. Any of the latter may, in turn, thus be commanded by means of signal 34 to receive data from the microprocessor 12 by means of data bus 20 through latch/buffer 28 on the latch/buffer output interconnected to the tristate data bus 38. Or, conversely, data, commands, and the like may be received from the cable communication control circuit 32, instrument bus control circuit 36 or data acquisition control circuit 44, by the tristate data bus 38, delivered through the latch/buffer 28, and thus received by the microprocessor 12 for processing, storage in RAM 16 or the like.

Reasons for the microprocessor receiving and/or storing such data will now be described in more detail. Referring first to the cable communication control circuit 32, it will be recalled that one of the features of the present invention is to permit interrogation of any tool comprising the logging string as well as any function performed by a particular tool under control of the microprocessor 12 which, in turn, acts in response to a depth interrupt from the surface system 106 indicating that the sonde is at a depth within the borehole wherein it is desired to acquire data. Thus, it may be appreciated that the microprocessor 12 requires software control whereby, in response to a data acquisition command from the surface system 106 the microprocessor 12 may generate a series of commands delivered to the various remote units 42 and their corresponding tools so as to effect such data acquisition.

Accordingly, various series of commands, each such series stored as a downloaded "table" may be desirably stored downhole in RAM 16 after delivery from the surface system 106. Thus it is desirable to provide means for the microprocessor 12 to receive such downloaded tables from the surface system 106 and deliver them in response to the control logic 22 through the communication control circuit 32 on the tristate data bus 38 and through the latch/buffer 28 on the data bus 20 for storage in the RAM 16. The details of the tables and how they are downloaded will be hereinafter described in more detail.

Yet another reason for the microprocessor 12 being able to control data acquisition and delivery to other circuits relates to the instrument bus control 36. It will be recalled from the foregoing that in response to the various sequences of commands or tables stored in RAM 16, the microprocessor 12 will desirably retrieve the sequences of commands comprising one of the tables in response to a sequence command from the surface system 106. The microprocessor 12 will thereafter deliver these commands sequentially to various logging tools in order to acquire data from the tools in a manner specified from the table recalled from the RAM 16.

Thus, still referring to FIG. 1, it will be noted that such commands may be delivered in the following manner. In response to a request from the surface system 106 delivered to the microprocessor 12, the microprocessor will address by means of address 18 the table specified by the command from the surface system 106. The microprocessor 12 will thereafter begin retrieving the series of tool commands in the particular table thus addressed and stored in RAM 16 by addressing the RAM 16 on address bus 18 and thereafter retrieving contents of the table, e.g. the tool commands, on the data bus 20. The microprocessor 12 will thereafter generate a timing/control signal 24 causing the control logic 22 by means of device select/control line 34 to activate the instrument bus control 36.

In this manner, a remote unit address and function or tool command corresponding to the particular command just retrieved from the table in RAM 16, to be described hereinafter in more detail, may then be cause to be delivered by the microprocessor 12 on data bus 20 through the latch/buffer 28 and further on tristate data bus 38 to the instrument bus control 36. This particular command and address will thereafter be delivered on the instrument bus 40 to the remote units 42.

As will be described later, each remote unit 42 and its corresponding tool interconnected on the instrument bus 40 has been assigned a unique address such that the particular remote unit 42 and its tool will recognize when it is being addressed by the microprocessor 12 in accordance with the address just retrieved from the tables stored in RAM 16. Thus, as previously described, the reason for permitting the microprocessor 12 to communicate in such manner with any desired tool interconnected to the instrument bus 40 as specified by the particular address retrieved from the RAM 16 is to enable the microprocessor 12 to interrogate not only any desired tool on the instrument bus 40 but any function within the tool. As previously noted the functions within the tool will be specified by the commands stored in the particular table in RAM 16 which are called up by the sequence command from the surface system 106.

Referring now to the data acquisition control circuit 44, explanation will now be given as to why this particular circuit is desirably in communication with the microprocessor 12. There are numerous parameters associated with a logging sonde which are desirably retrieved and stored independently of the particular combination of logging tools comprising the logging string. An example of such parameters, which will, of course, have corresponding transducers associated therewith for measuring them may be seen in the transducers functionally depicted in block 50, are referred to as local sensors. These parameters may be the cable head voltage, the temperature of the sonde at various locations, power supply voltages for circuits within the sonde, and the like. These parameters, after being converted to analog voltages by appropriate transducers, are delivered from the local sensors circuit 50 as sensors circuit output 48 to a multiplexer/analog-to-digital converter 46, which, in turn, is interconnected to the data acquisition control circuit 44 depicted in FIG. 1.

Thus, the microprocessor 12 by means of the device select/control 34 may select or address the data acquisition control 44. Thereafter, a particular one of the parameters carried on sensor circuit output 48 may be selected in the multiplexer/converter 46 by means of delivery of the appropriate control signal from the microprocessor through the latch/buffer 28 and on the data bus 38 to the data acquisition control circuit 44. This control signal now residing in the circuit 44 will be delivered to the multiplexer/converter 46 whereby the multiplexer will be instructed to select the parameter input on outputs 48 desired for delivery through the multiplexer to be converted to digital form in the multiplexer/converter 46. The digital result corresponding to the desired parameter measurement will thereafter be delivered through the control circuit 44 on the data bus 38 to the latch/buffer 28 and thus, under control of the microprocessor 12, the digitized result will be further delivered to the RAM 16 for storage prior to delivery to the surface system 106 after formatting by the microprocessor 12.

Downloaded Tables

The manner in which the aforementioned tables will be downloaded from the surface system 106 and stored in RAM 16 for further use by the microprocessor 12 as well as the content of the tables and their particular use will now be described in more detail. First, it will be noted that the actual software or computer program controlling the operational steps of the microprocessor may first be preferably stored in PROM 14 prior to operation of the overall logging system. Thus under consideration at present is the particular manner in which the "tailor made" instructions to the microprocessor 12 (which control the order in which logging tools and the various functions performed by each tool are interrogated by the microprocessor 12) are downloaded from the surface.

First the computer on the surface transmits a reset command from the surface system 106 on the logging cable 30 to the control circuit 32, which is received by the microprocessor 12 via the data bus 38 through the latch/buffer 28. The microprocessor 12, by means of the program table stored in PROM 14 recognizes the reset command as such and begins implementing reset functions. Such functions may include generation of instructions by the microprocessor 12 to clear the RAM 16, the resetting of all devices on the I/O bus 40 and the like, whereupon the microprocessor 12 returns to an idle loop defined by the PROM 14.

Next a command is transmitted down the logging cable 30 commanding the microprocessor 12 to load the sequence of commands to microprocessor 12 comprising the first table, which will be followed by the digitally encoded commands themselves which make up the first table. As with the reset command, the microprocessor 12 in conjunction with the software stored in PROM 14 recognizes this table load command and thereafter proceeds to store the table 1 words in RAM 16 as they arrive. The load table 1 command will include a word count identifying the number of commands included in the table, such that the microprocessor 12 will recognize when the last command of the table has been received.

Next, an echo table command is transmitted from the surface system 106 down the cable 30 to the microprocessor 12, which is again recognized by means of the software in PROM 14. The purpose of this command is to instruct the microprocessor 12 to transmit to the surface system 106 the table of commands just transmitted downhole and stored in RAM 16 for purposes of an integrity check. The microprocessor 12 during storage of the downloaded table in RAM 16 stored the memory location of the table in RAM 16 as well as the number of command words stored. The table, including all commands, thus, in turn, is now recalled from the RAM 16 and transmitted up the logging cable 30 to the surface system 106. The surface controller (not shown) comprising a portion of the surface system 106 thereafter stores this table of commands in buffer memory which are then checked against the known contents of the first table which were previously sent downhole by the surface system 106.

Upon comparison, one of two possible results occur. Either a comparison reveals that the table commands were transmitted downhole and stored in RAM accurately, whereupon the system proceeds, in like manner, to download, and check the loading of the next table until the loading or storage of all such tables is completed. The other possible result is that, upon such comparison, one or more words of the table stored in RAM 16 will not agree with those stored in buffer in the surface system 106, indicating a communication or parity error being detected. In this event, the table is re-transmitted downhole, checked again, and the process repeated until a valid storage of the first table is effected in RAM 16. The system will then proceed to download the next successive tables and check them until all such tables have been stored. It will be noted that the total number of tables as well as the word-length of each command comprising the table and the length of any particular table are a matter of engineering choice, largely defined by the desired complexity of the overall logging system.

The content of a particular table will now be described in more detail. It will be recalled that each table may be uniquely identified by a particular digitally encoded sequence command from the surface system 106, and that upon recognition of such a sequence command transmitted downhole on the logging cable 30, the microprocessor 12 will retrieve from RAM 16 in sequence each such command comprising the particular table called up from the surface system 106.

Each command in a given table, in order, corresponds to a particular location in the logging sonde wherein either data acquisition is desired or it is desired to deliver a control function. As but a simple example, the first command of the first table may be a command to interrogate a natural gamma ray counter accumulation residing in a radioactivity logging tool, and to deliver such accumulated count to the microprocessor 12 for delivery to the surface. In like manner, the next command in the first table may be a command to be delivered to an acoustic logging device commanding it to fire the first transmitter.

Thus, it may be seen that the sequence in which various tools or other locations in the logging sonde are controlled by the microprocessor 12 as well as which particular functions associated with the tool or locations in the sonde are selected is controlled by the various commands comprising the downloaded tables stored in RAM 16. Moreover, the particular order of commands may be varied by either the microprocessor 12 downhole or from the surface by simply calling up differing tables of commands at different times.

Figure 2:
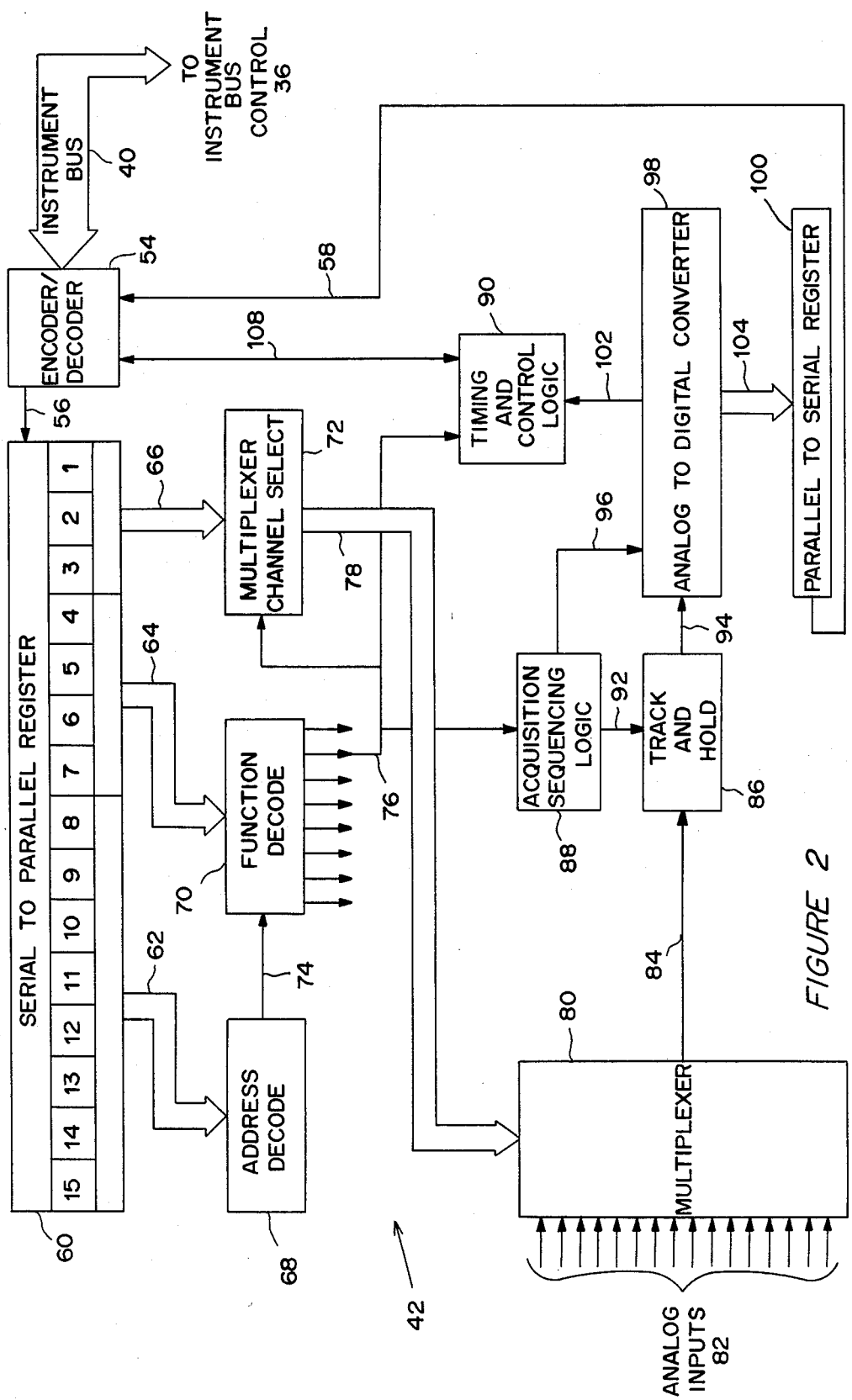
FIG. 2 is a functional block diagram of the remote unit depicted in FIG. 1.

As will further be described with respect to FIG. 2, it will be appreciated that because of the aforementioned interconnection of a plurality of logging tools and other instrumentation on a common I/O bus 40, each command comprising the tables stored in RAM 16 must include a series of address bits or an "address field" uniquely identifying the particular tool or other circuit to which a command of the table is to be delivered. Similarly, another series of bits known as a "function code" or "command code" uniquely identifying the particular function to be performed by that tool or by another circuit location in the logging sonde defined by the address field is required.

The precise manner in which a particular tool or other circuit location in the logging sonde is addressed by means of the aforementioned commands residing in the tables in RAM 16, as well as the precise manner in which the functions associated with the particular command are understood by the tool or circuit and implemented will thus now be described in more detail.

Operation of Remote Units 42

It will be recalled that the contents of a particular table stored in RAM 16 will define the parameters to be acquired and the order or acquisition, and that the variables thus acquired may be from any tool in the string and in any number from a particular tool. Thus, for illustrative purposes, if there are three tools in the string, a first table may comprise commands causing measurements to be made of parameters 1-3 by tool number 3. The particular commands comprising a second table may request the microprocessor 12 to first acquire parameters numbers 1 and 2 from tool number 3, followed by parameter number 2 from tool number 1, followed by parameter number 3 of tool number 3, and finally all parameters of tool number 2.

It will be noted, however, that in a more typical application of the flexibility of the present invention, many parameters will be desirably acquired at relatively short increments of the borehole depth, such as every 1/64 of a foot. These parameters will typically be listed in one table. Still another set of parameters, which typically is less in number, will be desirably acquired at greater borehole increments and commands to effect acquisition of this data will be stored in yet another table. Thus, at each of the smaller borehole increments, an appropriate sequence command will be generated from the surface to cause the microprocessor 12 to retrieve the commands and thus the parameters associated with the first table at the smaller borehole increments. Depth interrupts generated by a depth encoder at the surface at larger borehole increments will generate an appropriate next sequence command or table retrieval command transmitted downhole to the microprocessor 12 so as to cause the microprocessor 12 to retrieve the commands associated with the second table for data acquisition at less frequent or more widely spaced increments of borehole.

In one practical example of the foregoing, wherein it is desirable to measure the angle of dip of a subsurface earth formation, the surface system 106 will download three tables: a first table including commands to acquire data from borehole calipers and dip meter pads every 1/64th of a foot, a second table including commands instructing the microprocessor 12 to acquire logging sonde orientation data such as magnetometer and accelerometer parameters and cable head voltage at every ¼th foot, and still a third table which includes commands instructing the microprocessor 12 to acquire the data which is only needed at less frequent or larger increments of borehole, namely temperatures, calibration signals, power supply voltages, and the like.

When the logging operation is commenced, in response to the aforementioned surface depth encoders, every 1/64th of a foot a depth interrupt transmitted on the logging cable 30 downhole will cause the microprocessor 12 to retrieve the first table and thus acquire the parameters associated therewith by executing the commands in the first downloaded table. In like manner, depth interrupts every ¼th foot will cause the acquisition of parameter data associated with the second table only on a quarter foot basis by means of the microprocessor retrieving and executing the second table commands. Finally depth interrupts every 4 feet will cause acquisition of the data associated with the third table every 4 feet.

It will thus be appreciated that, in this manner, valuable cable band width is preserved in that less frequently needed or critical data such as temperatures are not therefore unnecessarily generated on every 1/64th of a foot depth interval. Thus less frequently needed data does not "clutter" the extremely valuable and critical logging cable band width or time, which in modern day logging operations, is already pressed to the limit due to the increased number and complexity of logging measurements being made by modern day logging tools.

It will be noted that without the ability afforded by the present invention to select under software control the number and order, as well as the frequency of measurement of the parameters thus being acquired—which may be conveniently altered simply by means of downloaded software table changes—the only other practicable manner in which to, in effect, ensure retrieval of the most frequently needed data uphole is to reduce the logging speed, which is not a commercially feasible solution.

The acquisition of parameter measurements defined by a table may conveniently be referred to hereinafter as implementing a "sequence". Thus, the one word sequence command from the surface system 106 which causes the microprocessor 12 to acquire and send all of the parameters defined in table 1 may conveniently thus be called a "send sequence 1" command.

When the microprocessor 12 receives a send sequence command, it determines the function from the tables in PROM 14. If, for example, the command is the aforementioned "send sequence 1", the microprocessor 12 then sets up and acquires the data defined by table 1. If the data is from a tool, it issues the appropriate command on the instrument bus 38. The particular remote unit 42 contains an instrument bus interface/control logic circuit capable of recognizing that the particular interface and tool has been addressed, in a manner to be hereinafter described, and consequently implements the commands, sending the result back to the microprocessor 12, whereupon the data is, in turn, sent up on the logging cable 30 by the microprocessor 12. If, on the other hand, the data is "local", and thus generated by the local sensors 50, the data acquisition control circuit 44 will be addressed by a command from the table in like manner to the particular remote unit 42 being addressed, whereupon the microprocessor 12 will set up the A-to-D converter 46 for conversion to digital form of the parameter, which will be relayed by the control circuit 44 to the microprocessor, and thereafter to the surface system 106.

Thus, microprocessor 12 acquires and sends data, as defined by the particular table called up by the sequence control from the surface system 106, until the last parameter of the table is acquired and transmitted uphole. The microprocessor 12 thereafter returns to an idle loop defined in the PROM 14 software awaiting the next sequence command from the surface system 106. The software of the surface system 106, from its copy of the downloaded tables, may determine under software control at the surface how many words to expect back in response to a send sequence command, and may thus monitor the integrity of the returning data stream.

In passing, it will be noted that occasionally commands other than table retrieval or sequence commands may be generated from the surface system 106 and transmitted downhole while the sequencing algorithms (the data acquisition and telemetry in accordance with the downloaded tables) are being implemented. Such additional commands may be in response to operator entry via a conventional teletypewriter keyboard (not shown) located at wellsite. An example of such commands would be to request calibration of downhole tools, and in accordance with the present invention such commands would follow the return of the send sequence command data. Thus, the system is capable of transmitting downhole specific control commands in addition to sequence commands without interferring with the conventional downloaded table data acquisition.

Referring now more particularly to FIG. 2 wherein the remote unit 42 of FIG. 1 is depicted in greater detail, it will be noted that the instrument bus 40 carrying data and command words between the remote unit 42 and the instrument bus control 36 will be connected to an encoder/decoder 54 in the remote unit 42 which may, in one embodiment, be comprised of a commercially available Harris HD16408 Manchester encoder/decoder chip. The purpose of encoder/decoder 54 is to, in a conventional manner well known in the art, decode, check parity, and the like of digital words incoming on the instrument bus 40 prior to their delivery on encoder/decoder output 56 to a serial to parallel register 60, and to encode digital information received on encoder/decoder input 58, including inclusion of parity bits prior to transmission on the instrument bus 40 to the subsurface system 10.

As previously described, a typical command derived from a table stored in RAM 16 by the microprocessor 12 could, in the embodiment being presently described, be comprised of a 16 bit digital word delivered on the instrument bus 40 through encoder/decoder 54 on output 56 to the register 60. In the 16 bit word, bits 8–15 may preferably comprise an address field—a unique arrangement of bits whereby, when recognized or decoded by a particular remote unit 42, indicates to that remote unit 42 that it is specifically being addressed and thus commanded to respond by performing a particular function also identified in the 16 bit word. In one embodiment, presence of the 15th bit indicates that all tools are being addressed. The presence of a bit in the 14th place indicates that a first group of eight tools are being addressed, and, in like manner, presence of bits in the 13th, 12th, or 11th place in the 16 bit word would indicate that at least one tool of another group of eight tools corresponding respectively to each of the 13th, 12th, and 11th bits, are being addressed. Bits 8 through 10 may be reserved for identifying which one of 8 tools in any one of the four groups of tools corresponding to bits 11–14 are being addressed.

This address field is delivered on address field line 62 to an appropriate address decode circuit 68 whose function is to determine, based upon the aforementioned address field, whether the tool interconnected to that particular remote unit 42 is being addressed. This may be achieved by means of an internal address strapping (not shown) well known in the art whereby the address decode circuit 68 will compare the bits of the address field of the register 60 to the address strapping, and if a match is detected, will generate a function decode enable signal 74 delivered to an appropriate function decode circuit 70.

Still referring to FIG. 2, in the particular embodiment of the present invention being described, it will further be noted that bits 4–7 of the 16 bit word may be reserved for encoding $2^4$ or 16 possible functions to be performed by the particular tool associated with the remote unit 42 being addressed by the address field of bits 8–15. This function or command field will be delivered on function field line 64 to the function decode circuitry 70 for decoding. The function decoding circuitry 70 will provide an output for each of the decoded functions or commands indicated by the command field bits 4–7, each output of which will be routed to appropriate circuitry within the tool associated with the remote unit 42 for performing the particular function associated with the arrangement of function bits thus decoded. Accordingly, depending upon the particular command or function code decoded by decode circuitry 70, the tool may be instructed to provide calibration data, to motor pads in the open or closed position against the borehole, to provide calibration data, or the like. In the embodiment depicted in FIG. 2, it will be presumed that a particular function has thus been decoded indicated by function decode output 76 which will be delivered to acquisition sequencing logic circuitry 88 and timing and control logic circuitry 90 for purposes to be hereinafter described.

The remaining bits 0–3 of the 16 bit command word (derived from part of the table of RAM 16 and recalled by the sequence command from surface system 106 will determine which of a plurality of analog signals associated with the tool address will be measured. Thus, these bits will be delivered on multiplexer channel select line 66 to a multiplexer channel select circuit 72, which will decode these bits and deliver the result on multiplexer channel select output 78 to an analog multiplexer 80. Interconnected to the inputs of multiplexer 80 will be a plurality of analog inputs 82 each of which may be connected to a particular transducer capable of generating an analog voltage corresponding to the parameter to be measured by the transducer, such as borehole resistivity and the like. In response to a particular multiplexer output 78, one of the analog inputs 82 corresponding to the bit pattern comprised of bits 0-3 in the register 60 and decoded by the multiplexer channel select circuitry 72 will be selected for passage by the multiplexer 80 therethrough as multiplexer output 84 to a track and hold circuit 86.

In response to the function decode output 76, acquisition sequencing logic circuit 88 will generate an acquisition sequencing logic circuit output 92, causing the track and hold circuit 86 to pass the multiplexer output 84 present at the occurrence of the acquisition logic circuit output 92 through the track and hold circuit 86, and to deliver it as track and hold circuit output 94 to an appropriate analog to digital converter 98.

Thereafter, the acquisition sequencing logic circuit 88 will preferably deliver an acquisition sequencing logic circuit output 96 to the analog to digital converter 98, thereby causing the analog input 94 to be converted by the A-to-D converter 98 to digital bits in parallel form, which, in turn, are delivered on A-to-D converter output 104 to a suitable parallel-to-serial register 100.

Upon such conversion, indicated by A-to-D output 102, timing and control logic 90, will generate and deliver an output 108 indicating completion of an analog to digital conversion to the encoder/decoder 54 enabling it to receive in serial fashion on register output 58 the parallel bits stored in register 100 for delivery on the instrument bus 40 to the microprocessor 12. It will be recalled that these parallel bits stored in register 100 will correspond to an analog input 82 selected by multiplexer channel select output 78 and converted to digital form by the A to D converter 98 which is thereafter delivered on A to D output converter 104 to the register 100.

The embodiments of the invention in which an exclusive property or privilege is claimed is defined as follows.

1. A method for surface-controlled generation of the number, order and frequency of geophysical measurements from at least one of a plurality of logging tools of a logging sonde transversing within a borehole, comprising the steps of:

storing a plurality of tables comprised of digital words in said sonde, each of said digital words corresponding to a different function to be performed by said at least one of said plurality of logging tools, each of said digital words comprising an address field corresponding uniquely to each of said plurality of logging tools and a command field corresponding uniquely to one of said different function wherein the step of storing said plurality of tables comprises:
storing on said surface said plurality of tables;
transmitting a first of said tables of said sonde;
storing in said sonde said first table;
retrieving sequentially from said sonde in the order stored digital words comprising said first table;
transmitting said retrieved digital words to said surface;
comparing at said surface said retrieved and transmitted digital words with corresponding digital words from said first table stored at said surface;
transmitting a second of said tables to said sonde when a match is detected between said retrieved and transmitted digital words and corresponding digital words; and
transmitting said first table to said sonde in absence of said detected match;
generating at said surface in response to a first borehole depth location a first sequence command corresponding to a first of said tables;
transmitting said first sequence command to said sonde;
retrieving from storage within said sonde said first of said tables in response to said first sequence command;
sequentially delivering each of said digital words of said first table to said at least one logging tool;
activating said at lease one logging tool in response to said sequential delivery of said digital words of said first table to perform each of said different functions corresponding to each of said digital words of said first table;
generating at said surface in response to a second borehole depth location, a second sequence command corresponding to a second of said tables, said second of said tables having at least some digital words different from said digital words of said first table;
transmitting said second sequence command to said sonde;
retrieving from storage within said sonde said second of said tables in response to said second sequence command;
sequentially delivering each of said digital words of said second table to said at least one logging tool; and
activating said at least one logging tool in response to said sequential delivery of said digital words of said second table to perform each of said different function corresponding to each of said;
wherein each of said digital words of said first and second tables further include a multiplexer channel select field and wherein said activating of said at least one tool further includes selecting as a function of said multiplexer field one of a plurality of analog input measurements derived by said sonde for delivery to said surface.

2. The method of claim 1, wherein each of said different functions corresponding to each of said first table's digital words is performed prior to each of said different functions corresponding to each of said second table's digital words.

3. The method of claim 1, wherein said plurality of tables are transmitted from said surface to said sonde disposed within said borehole and stored in said sonde prior to generation of said first sequence command.

4. The method of claim 1, wherein said address field of at least two of said digital words of said first table are identical and said command fields corresponding to said at least two of said digital words are different.

5. The method of claim 7, wherein said address field of digital words from respective first and second tables are different.

6. The method of claim 5, wherein each said activation of a particular one of said at least one logging tools is in response to a particular one of said address fields of said digital words.

7. The apparatus of claim 9, wherein each said digital word of said tables has an arrangement of digital bits comprising:
   an address field, each said field uniquely corresponding to a different one of said logging tools; and
   a command field, each said command field uniquely corresponding to a different one of said functions, and wherein each said interface means further comprises:
      an address decode means for decoding said bits corresponding to said address field and granting exclusive access to said bus by said different one of said logging tools to which said unique address field corresponds; and
      a command decode means for decoding said bits corresponding to said command field and controlling said different one of said functions of said logging tools to which said unique command field corresponds.

8. The apparatus of claim 7, wherein each said interface further includes:
   enabling means interconnected between said address decode means and said command decode means for enabling said command decode means in response to decoding of said address field by a corresponding one of said address decode means.

9. Apparatus for surface controlled generation of the number, order and frequency of geophysical logging measurement from at least one of a plurality of logging tools disposed in a well logging sonde in response to the depth location of said sonde within a borehole including a sequence command generator located at said surface for generating sequence command signals and a telemetry link coupled between said sequence command generator and said sonde, comprising:
   universal control system means located within said sonde and interconnected to said telemetry link for controlling the number, order and frequency of said plurality of logging tools and of the functions of said plurality of logging tools in response to said sequence command signals, said universal control system means including means for storing and retrieving each of a plurality of digital words as a function of respective different one of said sequence command signals and each of said digital words corresponding to a different function to be performed by said well logging sonde and includes an arrangement of digital bits comprising a multiplexer channel select field;
   an input/output bus means for delivering said digital words to said well logging sonde; and
   a plurality of remote unit interface means each interconnected between said bus means and a respective one of said plurality of logging tools for receiving and decoding said digital words of said tables wherein said interface further includes:
      a multiplexer field decode means for decoding said bits corresponding to said multiplexer field;
      a plurality of analog voltages corresponding to different ones of said logging measurements;
      an analog-to-analog converter means having an output interconnected to said bus for digitizing selected ones of said analog voltages and delivering said digitized voltages to said bus; and
      a multiplexer means interconnected between said analog voltages and said analog-to-digital converter and having an input from said multiplexer decode means for delivering a selected one of said analog voltages for digitizing by said analog-to-digital converter as a function of said multiplexer field.

10. The method for surface-controlled generating of the number, order and frequency of geophysical measurements of claim 1 wherein said steps generating in response to borehole depth locations a first and a second sequence command comprises the step of generating said first and said sequence command in response to first and second borehole depth incremental intervals, respectively.

* * * * *